United States Patent

[11] 3,598,915

[72] Inventors Henry Mann
Holmdel, N.J.;
Joseph A. Whiteaker, Rock Hill, S.C.
[21] Appl. No. 879,262
[22] Filed Nov. 24, 1969
[45] Patented Aug. 10, 1971
[73] Assignee Bell Telephone Laboratories, Incorporated
Murray Hill, N.J.

[54] MEASUREMENT OF MAXIMUM OF A SERIES OF TIME INTERVALS
13 Claims, 41 Drawing Figs.

[52] U.S. Cl. .......... 178/69 A, 179/175.2 A, 328/111, 307/324
[51] Int. Cl. .......... H04l 1/00, H04m 3/22, H04m 1/24
[50] Field of Search .......... 178/69 R, 69 A; 179/175.2 A; 328/111, 130, 162; 307/234

[56] References Cited
UNITED STATES PATENTS

| | | | |
|---|---|---|---|
| 3,025,349 | 3/1962 | Peterson | 178/69 A |
| 3,084,220 | 4/1963 | Britt | 178/69 A |
| 3,182,127 | 5/1965 | Wiese | 178/69 A |
| 3,420,950 | 1/1969 | Britt | 178/69 A |

*Primary Examiner*—Kathleen H. Claffy
*Assistant Examiner*—Douglas W. Olms
*Attorneys*—R. J. Guenther and James Warren Falk

ABSTRACT: The circuit uses digital technique to measure the maximum break (or make) interval over a series of telehpone dial pulses. During the first break, clock pulses are serially counted in a binary coded decimal up-counter A. At the end of the first break, the nine's complement of the A count is transferred into a binary coded decimal reentrant up-counter B of the same count capacity as A; and, the old (first) count is retained in A. During the second (new) break, clock pulses are serially added (complementary addition equals subtraction of old count from new count) to the cont in B. Any clock pulses exceeding the capacity of B (in going from capacity count to zero count) are serially added to the old count in A. At the end of each new measured break, A contains the maximum of the old and new counts, the nine's complement of the maximum is transferred to B, and the process repeats. Visual display is provided of the maximum count by translation from clock pulse count in B to milliseconds.

INVENTORS H. MANN
J. A. WHITEAKER
BY
ATTORNEY

AND

AND

AND

DELAY

DELAY

DELAY

SINGLE SHOT

SINGLE SHOT

SINGLE SHOT

DELAYED SINGLE SHOT

DELAYED SINGLE SHOT

DELAYED SINGLE SHOT

REGENERATION

REGENERATION

REGENERATION

D-TYPE FLIP FLOP

S/R FLIP FLOP

S/R FLIP FLOP

JK FLIP FLOP

FIG. 36 2421 BCD COUNTER
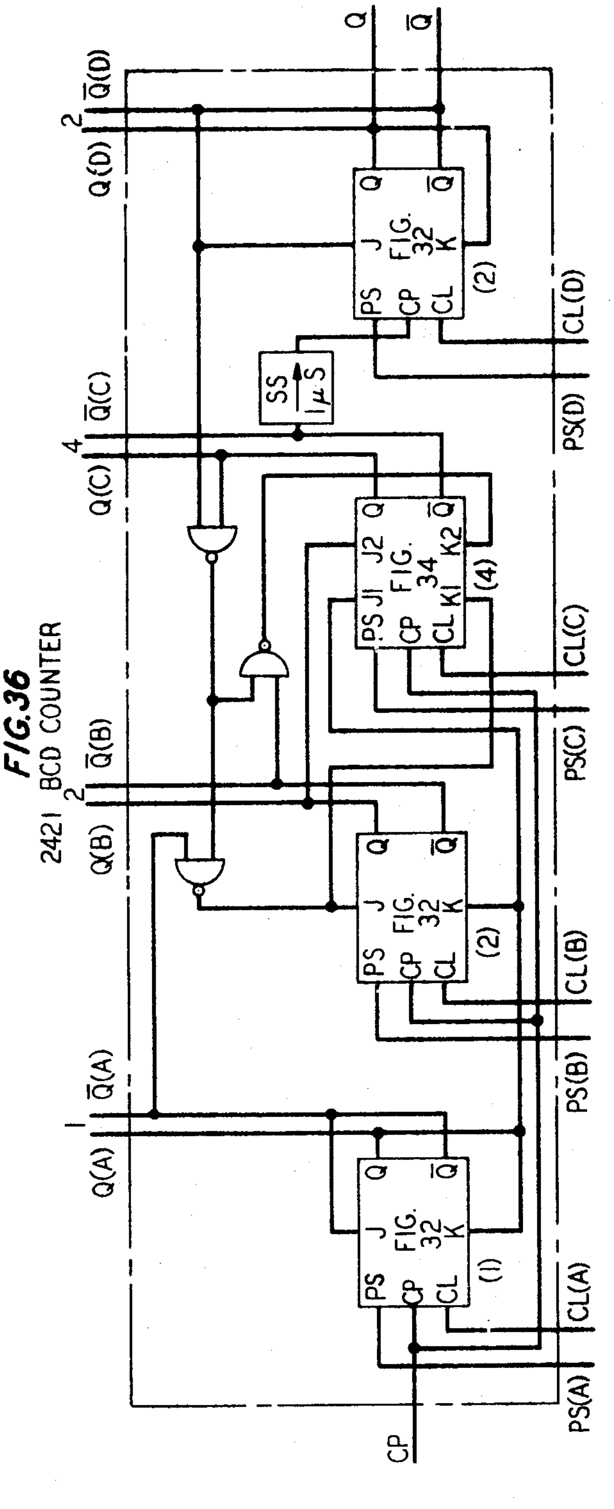
FIG. 37 2421 BCD COUNTER
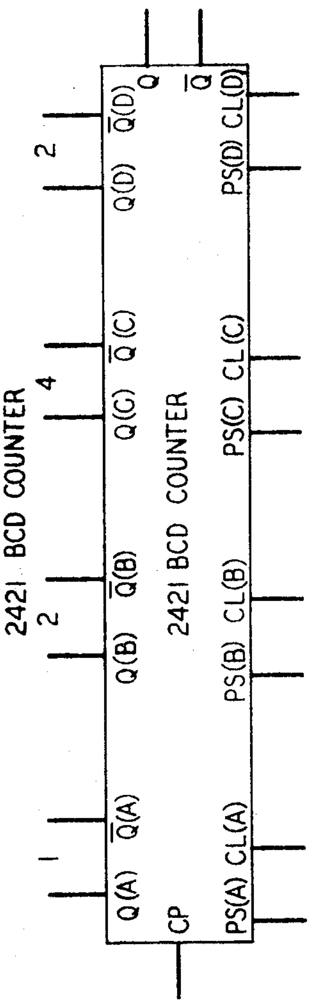

MEASUREMENT OF MAXIMUM OF A SERIES OF TIME INTERVALS

BACKGROUND OF THE INVENTION

This invention relates generally to the field of time interval measurement and particularly to the measurement of the longest or maximum time interval among a series of time intervals.

The prior art, such as U.S. Pat. No. 3,025,349 to N. E. Peterson of Mar. 13, 1962 and U.S. Pat. No. 3,182,127 to O. Wiese of May 4, 1965, has used two registers for registering indications of the lengths of old and new time intervals and separate circuits, such as adders or comparators, for ascertaining which of the two time intervals is the longer (maximum). In Peterson, at the end of the new interval measurement, the old measurement is subtracted (by complementary parallel addition) from the new measurement to determine whether to retain the old or new measurement as the maximum for comparison with a further time interval measurement. In Wiese, a comparing circuit compares the new measurement, as it is being made, with the old measurement as to determine which one to retain as the maximum.

While such prior art as Peterson and Wiese seem quite suitable for their purposes, it is always desirable, wherever possible, to reduce the amount or number of circuits required to perform logical operations.

The present invention provides an arrangement for measuring the maximum of a series of time intervals using two registers as in the prior art but without the necessity of special adder or comparator circuitry.

SUMMARY OF THE INVENTION

In broad aspect, the present invention contemplates (1) two registers which, at the end of the measurement of the first of a series of time intervals, contain first registrations indicative of that first time interval, (2) means for causing one of the registers to change its first or old registration the next or new time interval measurement to a new registration indicative of the difference between the next or new time interval and the old time interval, and (3) means controlled by the one register during that new time interval measurement for causing the other register to contain a registration indicative of the longer or maximum of the new and old time intervals.

In more particular aspect, the present invention contemplates the use of digital technique where the registers are pulse count registers controlled by clock pulses and where the registers contain clock pulse counts indicative of the measured time intervals or the difference between measured time intervals.

A still more particular aspect of the present invention contemplates registers of the same pulse count capacity where one register contains a pulse count equal to the complement of the pulse count in the other register and where a new time interval measurement causes clock pulses to be added to the one register so that the latter may indicate whether or not the new count exceeds the old count.

In specific aspect the present invention contemplates two binary-coded decimal up-counters of the same count capacity where, at the end of any measurement, the one counter, which is reentrant, contains the nine's complement of the pulse count in the other counter, and where a change from capacity count to zero count in the reentrant counter causes further clock pulses to be serially added to the count in the other counter such that the latter contains a pulse count indicative of the maximum measured time interval.

BRIEF DESCRIPTION OF THE DRAWING

The drawing consists of FIGS. 1 through 41 arranged on nine sheets as follows.

DETAILED DESCRIPTION

The detailed description of the exemplary embodiment is arranged in four main parts: the Circuit Symbols; the Signals; the Block Diagram; and, the Detailed Circuit Disclosure. These parts will be dealt with in the above order under the indicated headings.

CIRCUIT SYMBOLS

Figure 38:
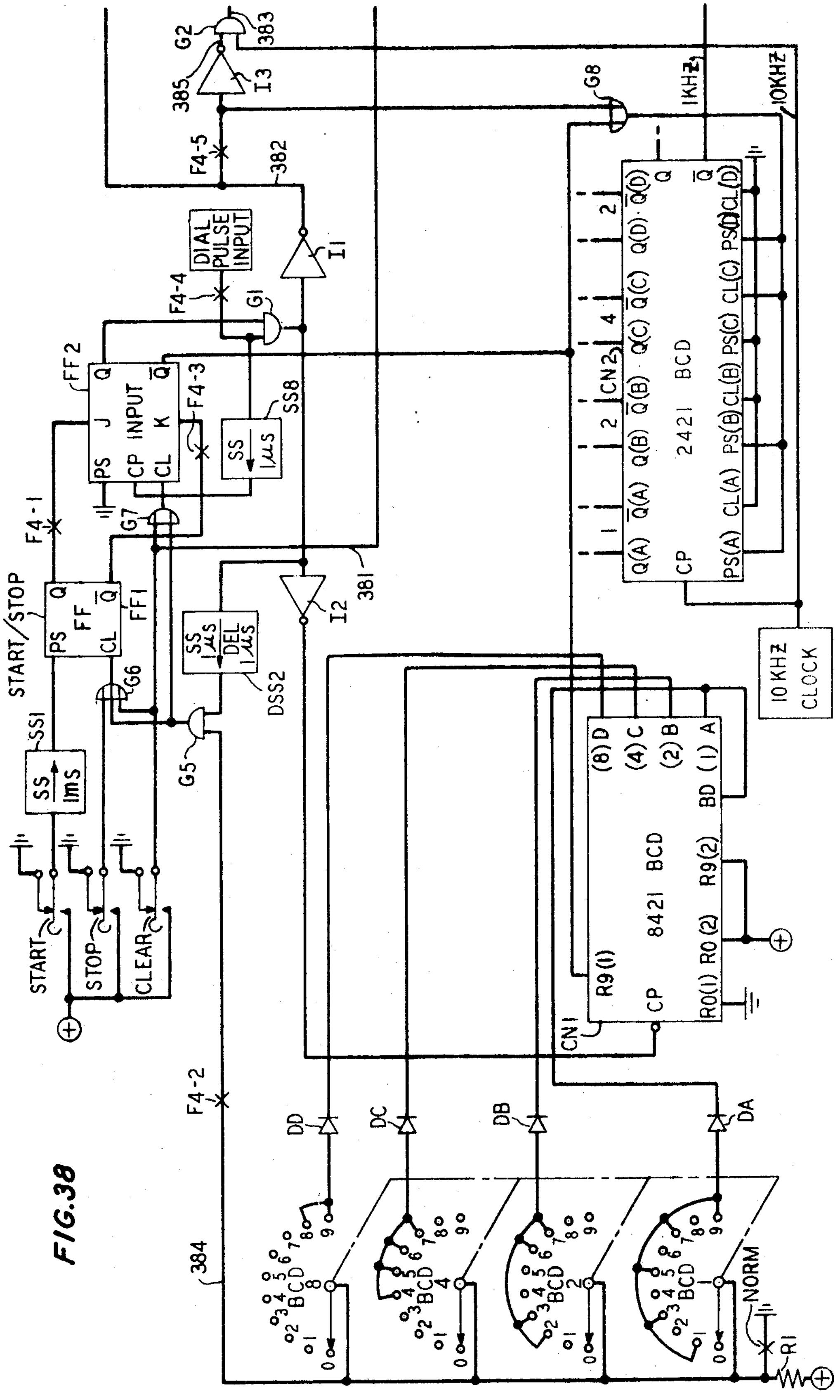
Figure 39:
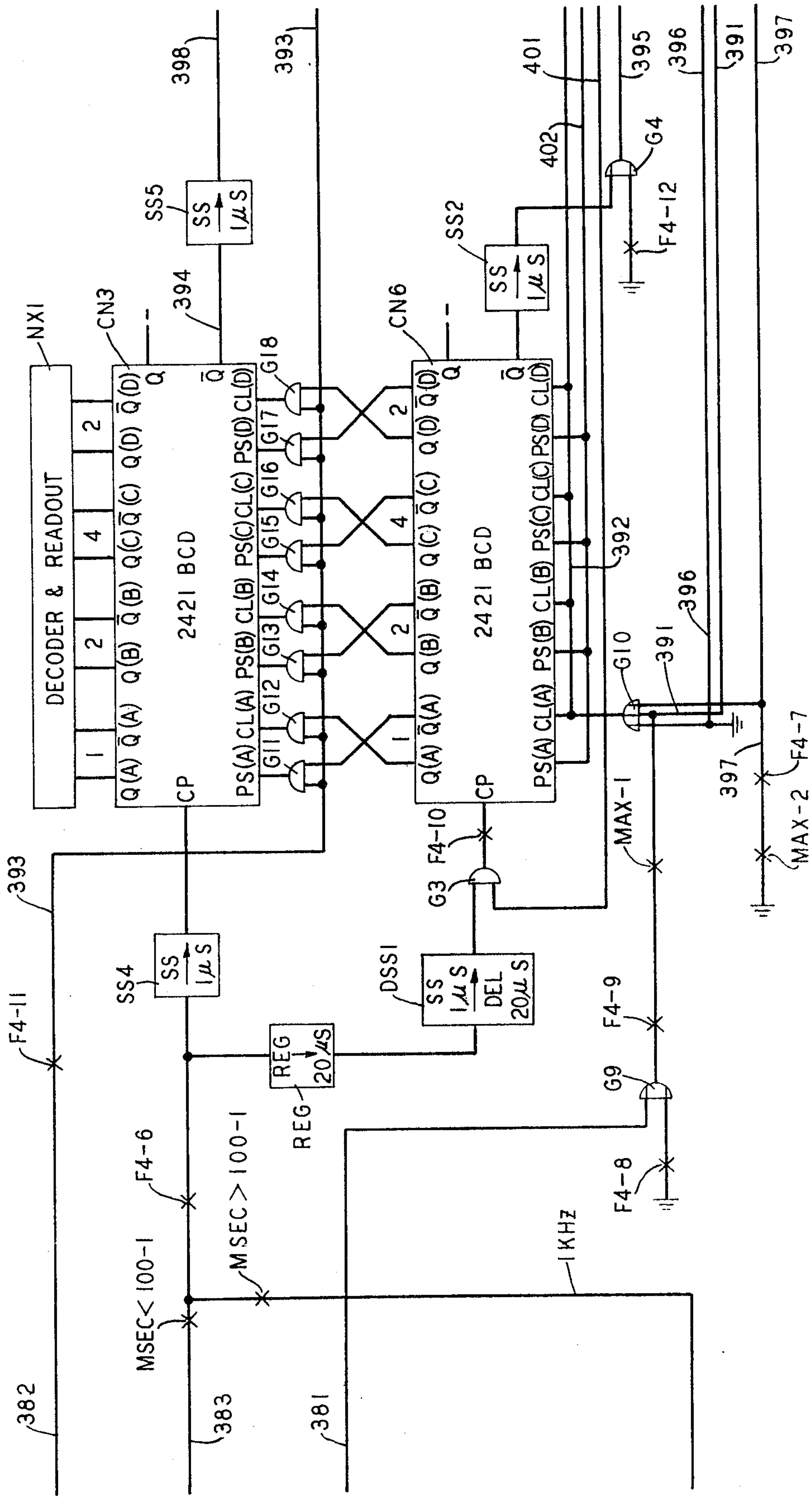
Figure 40:
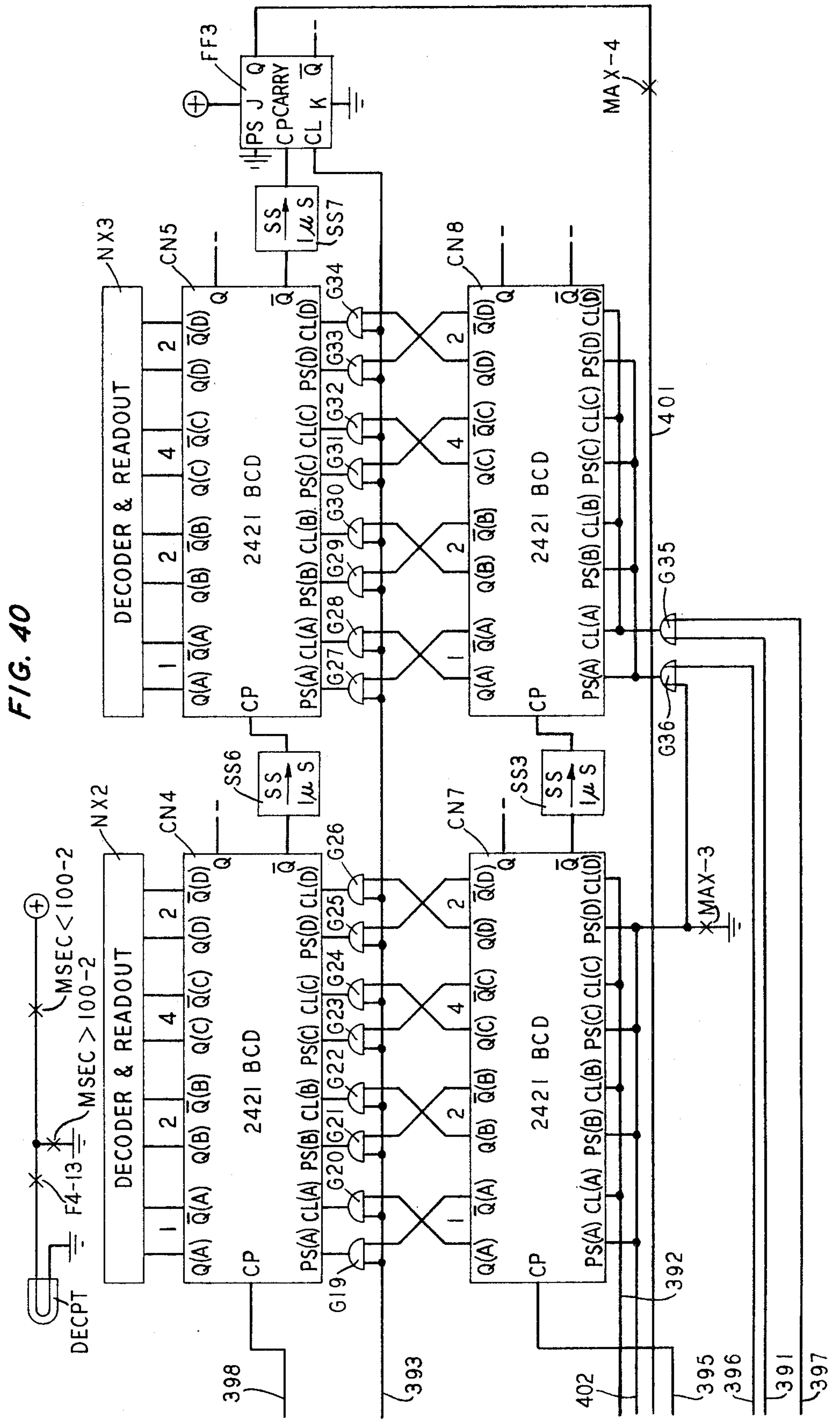

The following, under suitable headings, explains conventions and symbols as used in the detailed circuit layout of FIGS. 38, 39 and 40. In explaining the action of the circuit components, it is assumed that they are connected in the circuit as shown in FIGS. 38, 39 and 40. The diagrams used to show the action of the components are not intended to represent true waveforms, but merely to illustrate the logic level functions performed by the circuit components in the context of FIGS. 38, 39 and 40.

Battery and Ground

A circle with a plus sign (+) indicates the positive terminal of a source of direct current supply, the negative terminal of which is assumed to be connected to ground, which is considered as zero potential. The direct current voltage is 5 volts unless otherwise indicated.

Detached Contacts

A crossmark (×) on a conductor indicates a pair of electrical contacts associated with a switch. The contacts complete the circuit path when the switch is operated and open the circuit when the switch is not operated (released).

High and Low Signals

A potential condition, whether steady or transient, is said to be a high logic level if it is 2 volts or more positive. A low logic level condition is a voltage not more positive than about one-half of a volt.

NAND Gate

Figure 3:
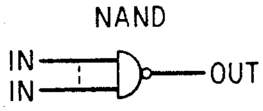

FIG. 3 shows the symbol for a typical NAND gate such as Motorola integrated circuit MC 830 and the like.

Figure 4:
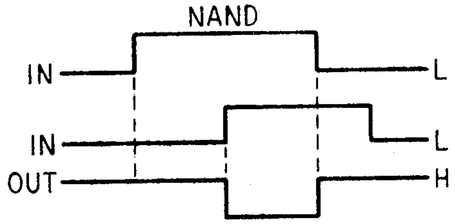

FIG. 4 shows the circuit action of the NAND gate. The output will be low only if all inputs are high: otherwise, the output will be high.

Inverter

Figure 5:
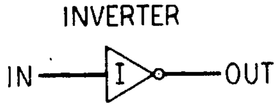

FIG. 5 shows the symbol for a typical inverter such as Motorola integrated circuit MC836 and the like.

Figure 6:
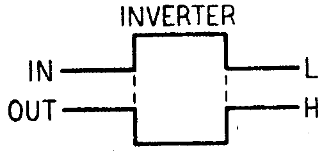

FIG. 6 shows the circuit action of the inverter. The output will be the inverse of the input. That is, a low input produces a high output and a high input produces a low output.

OR Gate

Figure 7:
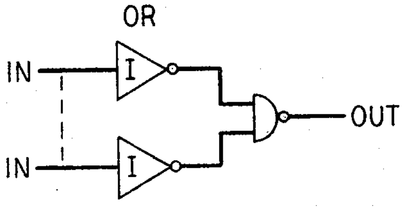

FIG. 7 shows how a NAND gate may be combined with inverters to produce an OR gate.

Figure 8:
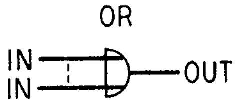

FIG. 8 shows the symbol for an OR gate.

Figure 9:
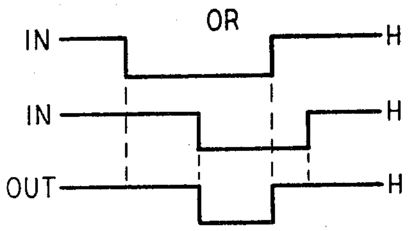

FIG. 9 shows the circuit action of an OR gate. The output will be low only when all inputs are low: otherwise, the output will be high.

AND Gate

Figure 10:

FIG. 10 shows how a NAND gate and an inverter may be combined to produce an AND gate.

Figure 11:

FIG. 11 shows the symbol for an AND gate.

Figure 12:
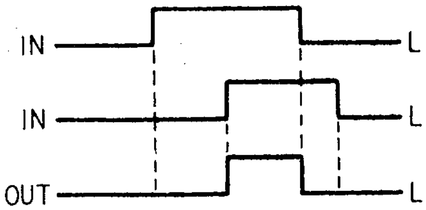

FIG. 12 shows the circuit action of an AND gate. The output will be high only when all inputs are high: otherwise, the output will be low.

Delay

Figure 13:
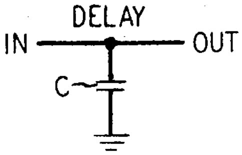

FIG. 13 shows how a capacitor can be connected to a conductor such that a delay is attached to each low-to-high transition. The amount of delay is a function of the value of the capacitor C and the amount and nature of connecting circuits.

Figure 14:
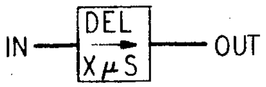

FIG. 14 shows the symbol for a delay circuit with an arrow pointing in the direction of the effect of the delay. The symbol includes the amount of delay (microseconds $\mu$sec. or milliseconds msec.) where pertinent.

Figure 15:
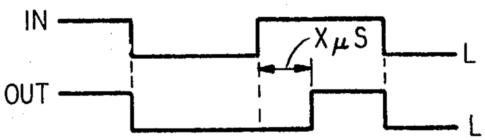

FIG. 15 shows the action of the delay circuit. A low-to-high transition at the input is delayed by $x$ $\mu$sec. at the output due to a controllable charging time of capacitor C. No delay to speak of is experienced at the output by a high-to-low transition at the input since the discharge path of capacitor C is arranged to be very fast.

Single-Shot

Figure 16:
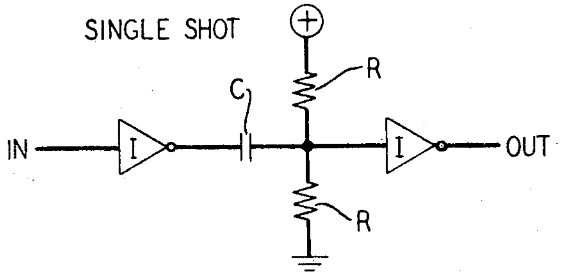

FIG. 16 shows how a single-shot circuit may be made to produce a low-to-high output of a specified short width from a longer low-to-high input.

Figure 17:
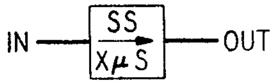

FIG. 17 shows the symbol for a single-shot circuit like FIG. 16.

Figure 18:
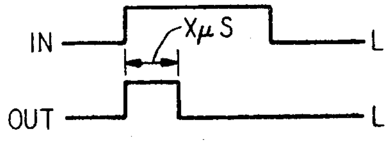

FIG. 18 shows the circuit action of the single-shot. A low-to-high transition at the input will produce at the output a low-to-high transition lasting for $x$ $\mu$sec. Normally, the output is low due to the inverter connected between the output and the normally high-resistance divider midpoint. Low-to-high transitions at the left terminal of capacitor C (same as high-to-low input transition) will have no effect on the output logic level. However, a low-to-high input will produce a high-to-low transition at once at the left terminal of capacitor C to cause a high-to-low transition at the divider midpoint, which in turn will produce a low-to-high output. The output will stay high for $x$ $\mu$sec until capacitor C charges to bring the divider midpoint back to a high condition, whereupon the output goes low again.

Delayed Single-Shot

Figure 19:
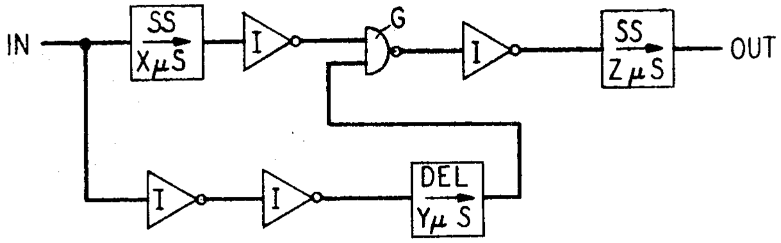

FIG. 19 shows how a delayed single-shot circuit may be made to produce a low-to-high output of a specified short width delayed a specified time from the controlling low-to-high transition of a longer input.

Figure 20:
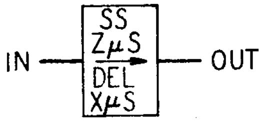

FIG. 20 shows the symbol of a delayed single-shot circuit like FIG. 19.

Figure 21:
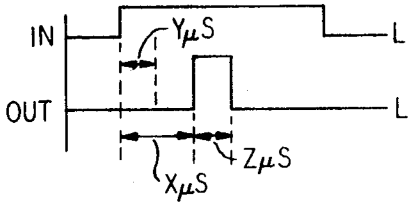

FIG. 21 shows the circuit action of the delayed single-shot. Under steady state conditions, the output is low from the single-shot $z$. No change at the input, except a low-to-high, will affect the output. When a low-to-high input occurs, the upper input of gate G goes low for $x$ $\mu$sec. and then returns to high and the lower input of gate G will stay low for $y$ $\mu$sec. and will then go high. As long as either input to gate G is low ($x$ $\mu$sec.), the output of gate G will be high. As soon as both inputs of gate G are high (at end of $x$ $\mu$sec.), the output of gate G will go low to provide a high-to-low transition at the input of single-shot $z$. The resulting output is a single-shot high of $z$ $\mu$sec. delayed $x$ $\mu$sec. from the controlling low-to-high input transition.

Regeneration Circuit

Figure 22:
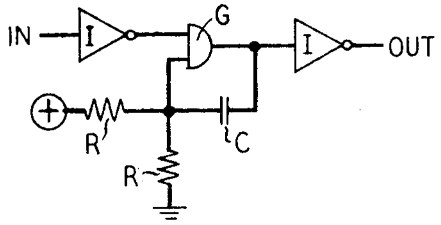

FIG. 22 shows how a regeneration circuit may be made for producing a relatively long low-to-high output from a shorter low-to-high input.

Figure 23:
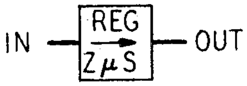

FIG. 23 shows the symbol for a regeneration circuit for producing a pulse of $z$ $\mu$sec. width.

Figure 24:
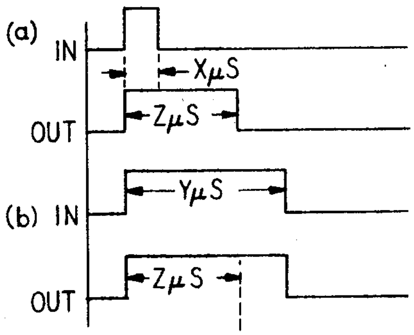

FIG. 24 shows the circuit action of a regeneration circuit like FIG. 22. Under steady state conditions the lower input to gate G is high and the output will be the same as the input. A high-to-low transition at the input will cause the output to go from high to low and to remain low as long as the input stays low. A low-to-high transition at the input will cause the output of gate G to go low and the main output to go high. The high-to-low output of gate G will be effective through capacitor C to drive the lower input of gate G low. This lower (low) input to gate G will maintain the output of gate G low until capacitor C can recharge through the connected circuitry to a point where its left electrode (lower input of gate G) has become sufficiently high to act as an enabling high for gate G. This delay time is Z msec. As in FIG. 24($a$), a shorter input ($X<Z$) will cause an output of length Z. As in FIG. 24($b$), a longer input ($Y>Z$) will cause an output of the length of the input (Y).

D-Type Flip-Flop

Figure 25:
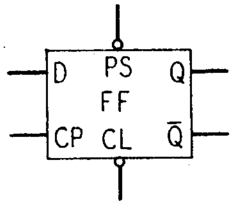

FIG. 25 shows a typical D-type flip-flop such as Texas Instruments integrated circuit SN 7474 and the like. D is the data input, CP is the clock pulse input, PS is the preset input, CL is the clear input, Q is the "1" output, and $\overline{Q}$ is the "0" output. With PS low and CL high, a preset condition exists with Q high and $\overline{Q}$ low. With PS high and CL low, a clear condition exists with Q low and $\overline{Q}$ high. With PS high and CL high, Q is made the same as the high or low condition of the D input when CP is pulsed low-to-high. At all other times, Q and $\overline{Q}$ are unaffected by changes on the D input. The following table summarizes the above:

| CP | D | PS | CL | Q | $\overline{Q}$ |
|---|---|---|---|---|---|
| X | X | L | H | H | L |
| X | X | H | L | L | H |
| P | L | H | H | L | H |
| P | H | H | H | H | L |

P...means a pulse from low-to-high
L...means low
H...means high X...means not controlling

Set-Reset Flip-Flop

Figure 26:
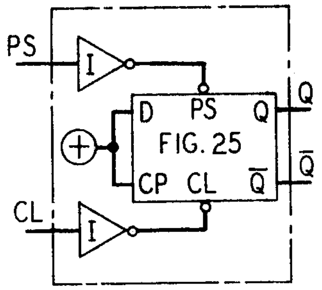
Figure 27:
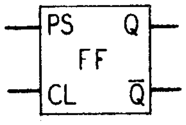

FIG. 26 shows how a flip-flop like FIG. 25 may be arranged to produce a S/R (set-reset) flip-flop, the symbol for which is shown in FIG. 27. In FIGS. 26 and 27, the respective preset and clear inputs PS and CL are controllable by high-to-low pulses to respectively set (Q high and $\overline{Q}$ low) and reset (Q low and $\overline{Q}$ high) the flip-flop.

JK Flip-Flop

Figure 28:
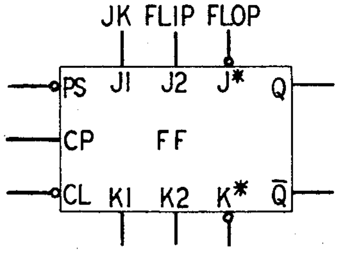
Figure 29:
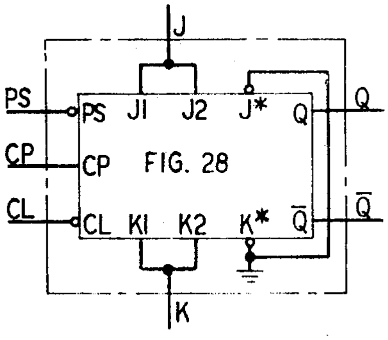
Figure 33:
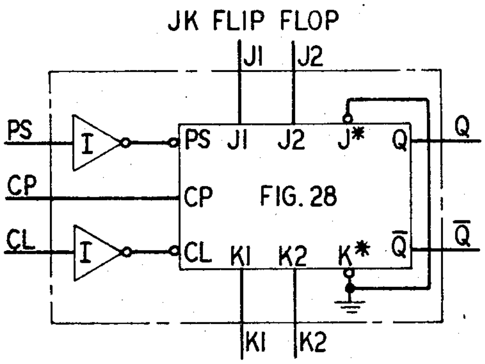

FIG. 28 shows a typical JK flip-flop such as Texas Instruments integrated circuit SN 7470 and the like. PS is preset, CP is clock pulse, CL is clear, Q is the "1" output, $\overline{Q}$ is the "0" output, and J1, J2, K1, K2, J* and K* are the various J and K inputs. Whenever the J* and K* inputs are not used, they are grounded as shown in FIGS. 29 and 33. If only one J or K input is used, the J1 and J2 or K1 and K2 are both connected together as shown in FIG. 29, The J and K information is changed, if at all, when the CP input is low.

Figure 30:
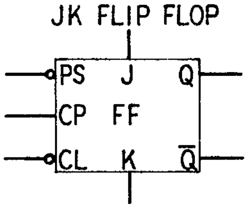

FIG. 30 is the symbol for the circuitry of FIG. 29. Here, when CP is low, a low on PS presets the flip-flop to Q high and $\overline{Q}$ low, and a low on CL clears the flip-flop to Q low and $\overline{Q}$ high. As long as the preset PS or clear CL is low, pulses on the CP input have no effect: the preset PS and clear CL must be high for pulses on the CP input to be effective. With J and K both low, a low-to-high pulse on CP does not affect the state of Q and $\overline{Q}$. When J and K are both high, a low-to-high pulse on CP will toggle the Q and $\overline{Q}$ outputs (change lows to highs and vice versa). With J low and K high, a low-to-high pulse on CP causes Q to be low and $\overline{Q}$ to be high. With J high and K low, a low-to-high pulse on CP causes Q to be high and $\overline{Q}$ to be low. The following table shows this circuit action:

| CP | J | K | Q | $\overline{Q}$ |
|---|---|---|---|---|
| P | L | L | X | X |
| P | H | H | T | T |
| P | L | H | L | H |
| P | H | L | H | L |

L...means low
H...means high
X...means no change
T...means toggle (high-to-low or vice versa).

Figure 31:
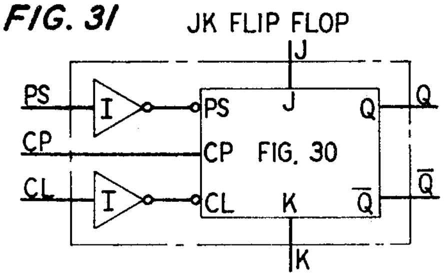
Figure 32:
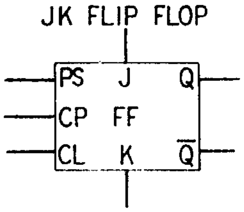

FIG. 31 shows how to modify the flip-flop of FIG. 30 so that the preset PS and clear CL inputs are responsive to highs instead of lows. The symbol for FIG. 31 is shown in FIG. 32.

Figure 34:
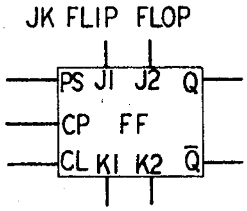

FIG. 33 shows how to modify the flip-flop of FIG. 28 so that the preset PS and clear CL inputs are responsive to highs instead of lows, so that the J* and K* inputs are not used, and so the J1, J2, K1 ad K2 inputs are separately available. The symbol for FIG 33 is shown in FIG. 34. Here, with CP low, a high on PS sets Q high and $\overline{Q}$ low and a high on CL clears Q to low and $\overline{Q}$ to high. With both J1 and J2 low and both K1 and K2 low, a high on CP does not change the state of Q and $\overline{Q}$. With all of the J and K inputs high, a high on CP toggles the Q and $\overline{Q}$ outputs. With either J1 or J2 low and both K1 and K2 high, a high on CP sets Q low and $\overline{Q}$ high With both J1 and J2 high and K1 or K2 low, a high on CP sets Q high and $\overline{Q}$ low.

8421 BCD Counter

Figure 35:
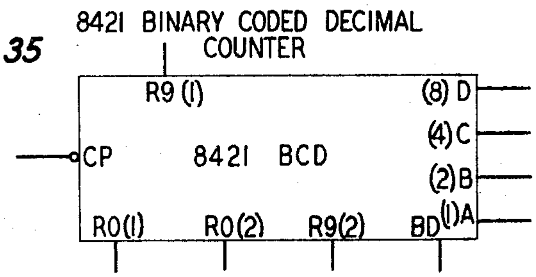

FIG. 35 shows the symbol of a typical decade counter such as Texas Instruments integrated circuit SN 7490 and the like. The binary-coded decimal weighings of the output leads A, B, C and D are 1, 2, 4 and 8, respectively. Used as a symmetrical divide-by-ten counter, the D output is connected to the CP input, BD is the input, and A is the output. Used as a binary-coded decimal counter, BD is connected to A, and CP is the input.

As a BCD counter, if RO(1) and RO(2) are high and at least one of R9(1) and R9(2) is low, the counter remains in state zero (0000). If R9(1) and R9(2) are high, the counter remains in state nine (1001). If R0(1) or R0(2) is low and R9(1) or R9(2) is low, the following table shows the states of the A, B, C and D outputs as the clock pulse input CP (P) receives high-to-low pulses.

| CP | 1<br>A | 2<br>B | 4<br>C | 8<br>D | Decimal count |
|---|---|---|---|---|---|
| P | L | L | L | L | 0 |
| P | H | L | L | L | 1 |
| P | L | H | L | L | 2 |
| P | H | H | L | L | 3 |
| P | L | L | H | L | 4 |
| P | H | L | H | L | 5 |
| P | L | H | H | L | 6 |
| P | H | H | H | L | 7 |
| P | L | L | L | H | 8 |
| P | H | L | L | H | 9 |
| P | L | L | L | L | 0 |
| Etc. | | | | | |

2421 BCD Counter

FIG. 36 shows how flip-flops like those of FIGS. 32 and 34 may be connected to produce a 2421 binary-coded decimal counter. The 2421 code is a self-complementing binary-decimal coding.

FIG. 37 is the symbol for the circuit of FIG. 36. With the clock pulse input CP low, a high on any preset input PS sets the corresponding stage to Q high and $\overline{Q}$ low and a high on any clear input CL clears the corresponding stage to Q low and $\overline{Q}$ high. The following table shows the action of the circuit set for counting in response to low-to-high pulses (P) on input CP, outputs Q and $\overline{Q}$ being the same as outputs Q(D) and $\overline{Q}$(D).

| CP | 1<br>Q(A) | 2<br>Q(B) | 4<br>Q(C) | 2<br>Q(D) | Decimal count |
|---|---|---|---|---|---|
| P | L | L | L | L | 0 |
| P | H | L | L | L | 1 |
| P | L | H | L | L | 2 |
| P | H | H | L | L | 3 |
| P | L | L | H | L | 4 |
| P | H | H | L | H | 5 |
| P | L | L | H | H | 6 |
| P | H | L | H | H | 7 |
| P | L | H | H | H | 8 |
| P | H | H | H | H | 9 |
| P | L | L | L | L | 0 |
| Etc. | | | | | |

SIGNALS

Figure 2:
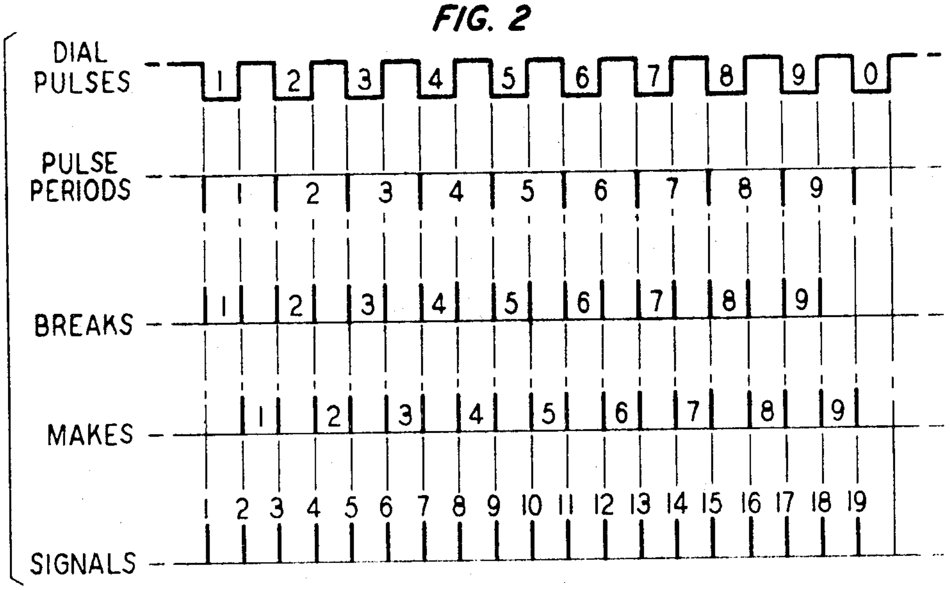
FIG. 2 is a chart illustrating various aspects of telephone dial pulses used by example as the source of time intervals to be measured; and, FIGS. 3 through 37 show circuit components and symbols used in the detailed circuitry of FIGS. 38, 39, and 40.

Since the exemplary disclosure is of part of a test set for measuring various aspects of telephone dial pulses, FIG 2 is provided to explain the type of pulsing involved and the significant signals which can be derived from such pulsing The top line in FIG 2 shows a series of 10 break intervals and the nine intervening make intervals making up nine full pulse periods. Nominally, telephone dials will pulse at the rate of about 10 pulses (pulse periods) per second with about a 50—60 percent break and a corresponding 50—40 percent make (percentage of total pulse period). Of course, the pulsing speed and percentages can vary quite widely, as is well known. In FIG. 2, the top line designates the ten break intervals, the second line designates the nine full pulse periods, the third line designates the nine break intervals of the first nine pulse periods, and the fourth line designates the nine make intervals of the first nine pulse periods. The fifth line shows the 19 signals (transitions) definitive of the parts of the first nine pulse periods.

In measuring dial pulses, or any other similar time interval phenomenon, it will be appreciated that any of the makes, breaks, pulse periods, or pulse transitions can be arranged by suitable well known circuitry to be of any desired polarity depending upon the requirements of the circuit controlled thereby. For example, in the detailed circuitry to be described hereinafter, it has been convenient to discuss responses to positive or high signals even though the particular time intervals of interest, such as the break intervals of FIG 2, may sometimes be thought of in the opposite sense. Likewise, the make intervals will be considered as negative or low even though they may generally be considered in the reverse sense.

It is desirable when using clock-controlled measuring circuitry, as in the exemplary disclosure, to arrange the dial input circuit so that the input dial pulses are synchronized with the clock. This will insure that switching and logic functions are performed with the minimum amount of error. Such an arrangement for clock synchronization of otherwise random input pulses is disclosed and claimed in an application of R. B. Heick, Ser. No. 849,997, filed on Aug. 14, 1969, allowed Dec. 16, 1970, now Pat. No. 3,582,795, and entitled "Delayed Clock Pulse Synchronizing of Random Input Pulses." However, as mentioned hereinafter, the present circuit can measure input signals not synchronized with the clock pulses and can do so with negligible error.

BLOCK DIAGRAM

Figure 1:
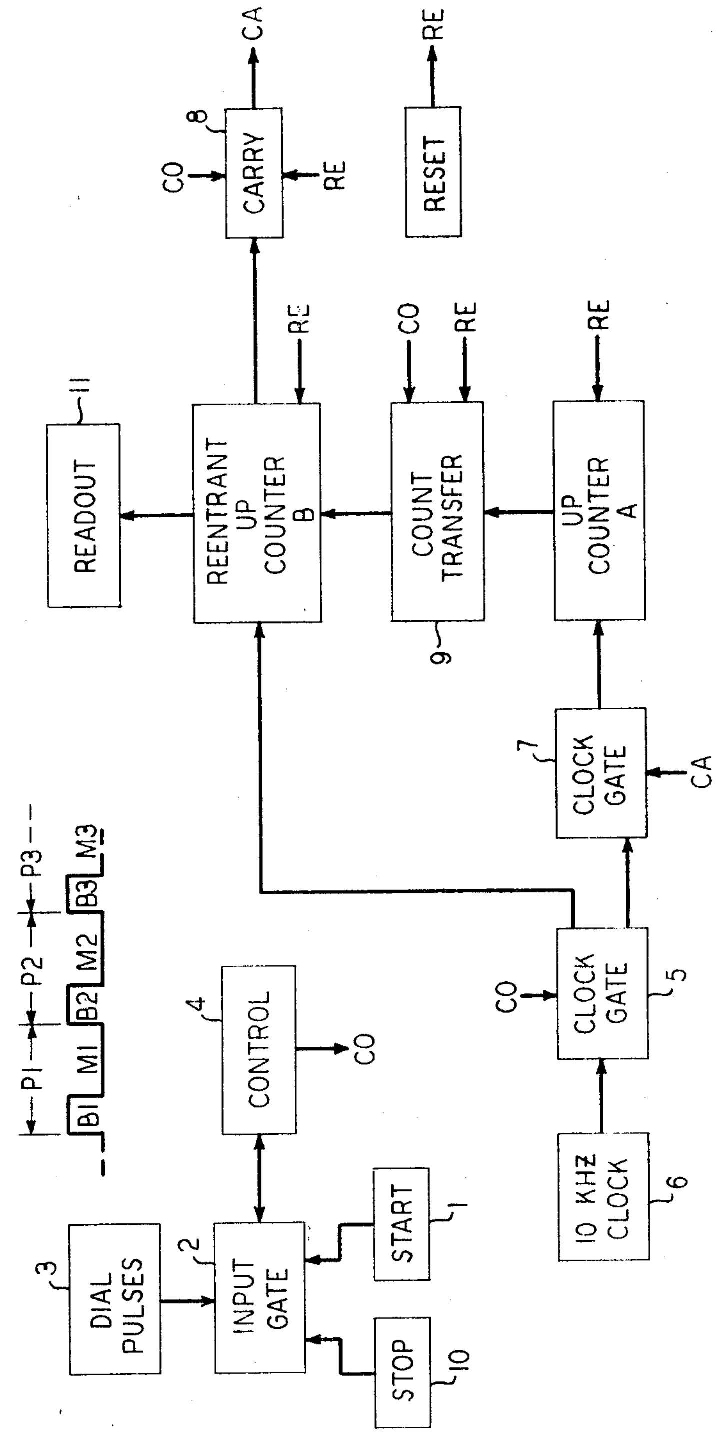
FIG. 1 is a block diagram of the detailed circuit embodiment shown in FIGS. 38, 39 and 40 arranged as shown in FIG. 41 (on same sheet as FIG. 1)

The block diagram of FIG. 1 shows the main functional parts of the detailed circuit of FIGS. 38, 39 and 40 Two full pulse periods P1 and P2 and part of a third pulse period P3 are shown, each divided into break (B1, B2 and B3) intervals and make (M1, M2 and M3) intervals The breaks have been shown as positive or high since the circuitry is arranged to be responsive to high signals (or low-to-high transitions) for measurement purposes and since it has been assumed that maximum break is to be measured.

The system is cleared for use by setting counter A to zero count and by setting reentrant counter B to maximum count, counters A and B having the same count capacity. When the start circuit 1 is energized, the input gate 2 is enabled to be controlled by the input dial pulses. As the dial pulses arrive at the input gate 2, signals will pass from the input gate 2 to the control 4 so that the control 4 knows when break intervals B1, B2, B3, etc. begin and end.

At the start of the first break B1, the control 4, over control lead CO, enables clock gate 5 to pass clock pips from the 10 kHz. clock source 6 to counter B and to clock gate 7. Since counter B was preset to maximum count, the first clock pip will cause the B count to go from capacity (maximum) count to zero count, causing carry 8 to produce a carry signal on lead CA. The carry signal on lead CA enables clock gate 7 to pass clock pips to counter A. The carry 8 remains as set throughout the first break B1 such that clock pips are fed to counters A and B during the entire break B1. Although not shown in FIG. 1, a slight delay is interposed between the output of clock gate 5 and the input to clock gate 7 so that the carry signal CA can enable clock gate 7, before that first clock pip appears at the input to clock gate 7, so that gate 7 can pass the delayed clock pulse.

At the end of the first break B1 (i.e., the start of the first make M1), the control 4, over control lead CO, disables clock gate 5 to prevent passage of any further clock pips through clock gates 5 and 7. Also, at the end of break B1, the control 4, over control lead CO, resets the carry 8 and enables the count transfer 9. Carry 8, in being reset, removes the carry signal from lead CA to disable clock gate 7 to prevent clock pips from passing therethrough to counter A. When the count transfer 9 is enabled, the nine's complement of the count in A is transferred to B as a new count in B. The count in A is retained therein. Since the counters A and B are binary-coded decimal counters, they will contain one's and zero's but on a self-complementing binary-coded basis which is translatable into decimal values. Thus, the transfer from A into B of the one's complement, in binary language, is also the transfer of the nine's complement, as in decimal language.

At this point in time, counter A contains a clock pip count indicative of the time interval or duration of the first break B1; and, counter B contains a clock pip count also indicative of that same time interval, even though the count in B is in complementary form.

At the start of the second break B2 (on the end of the first make M1), the control 4 disables the count transfer 9 over lead CO and enables clock gate 5 over lead CO. Clock gate 7 is disabled since the carry signal has been removed from lead CA by the resetting of the carry 8. Clock pips from the clock 6 are passed by clock gate 5 into counter B where they are serially added to the count in B. Since counter B contains a count which is the complement of the count in A, and since counters A and B have the same count capacity, the number of clock pips required to cause counter B to arrive at capacity count is the same as the count existing in counter A.

If the second break B2 is equal to or of less duration than the first break B1, counter B will not exceed its count capacity. In such a case, the end of the second break B2 (start of the second make M2) will cause the control 4 to disable clock gate 5 and to transfer to counter B (as a new count) the complement of the old (and longer or maximum) count in counter A.

If the second break B2 is greater than (longer—of more duration) the first break B1, counter B will be driven to capacity count, then to zero count, and then to another cumulative clock pip count until the end of break B2. When counter B goes from capacity count to zero count, the carry 8 is set to provide a carry signal on lead CA. The carry signal on lead CA thereupon enables clock gate 7 to add further clock pips serially to the old count in A. The result is that at the end of break B2, counter A will contain a clock pip count representative of the then maximum break interval B2.

At the end of the second break B2, the control 4 again transfers the complement of the A count into B, disables clock gate 5, and, if necessary, resets the carry 8.

The above process is repeated for each break interval B3, etc. until the circuit action is stopped, either manually or automatically. The circuit can be stopped manually at any time by manipulation of the stop circuit 10, whereupon the input gate 2 is disabled and the control 4 prevents any further action of the circuitry. Although not shown in FIG. 1, means is provided whereby the control 4 may cause an automatic stop after having processed a prescribed number of time interval measurements.

The readout 11 is a combined decoder and lamp display device whereby the count existing in counter B after transfer (i.e., the then maximum break count) is decoded from the binary form in counter B into decimal form for lighting the display to show the maximum break in milliseconds.

The circuitry is arranged, as will be obvious, to measure makes or pulse periods if desired, in addition to breaks. All that is necessary is for the input circuit to arrange and feed to the input gate 2 the appropriate ones of the signals shown in FIG. 2.

DETAILED CIRCUIT DISCLOSURE

Figure 41:
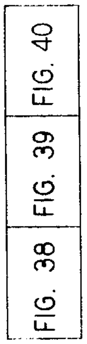

With reference to the detailed circuit disclosure of FIGS. 38, 39 and 40 (see FIG. 41 on same sheet as FIG. 1), certain switches and controls may warrant brief comment. In FIG. 39 are shown two make contacts designated MAX-1 and MAX-2 and in FIG. 40 are shown two make contacts designated MAX-3 and MAX-4. These contacts are closed when the MAX switch is operated to adjust the circuit for measuring a maximum time interval. In FIGS. 38, 39 and 40 are shown make contacts designated F4–1 through F4–13. These contacts are closed when the F4 switch is operated to adjust the circuit for measuring break intervals. In FIG. 39 are shown two make contacts designated MSEC<100–1 and MSEC>100–1 and in FIG. 40 are shown two make contacts designated MSEC>100–2 and MSEC<100–2. Contacts MSEC<100–1 and MSEC<100–2 are closed when switch MSEC<100 is operated to adjust the circuit for measuring intervals less than 100 msec. long. Contacts MSEC>Φ–1 and MSEC>100–2 are closed when switch MSEC>100 is operated to adjust the circuit for measuring intervals longer than 100 msec. In FIG. 38 are shown three switches designated START, STOP and CLEAR, each involving a contact arm shown in contact with a break contact and movable into contact with a make contact. When a switch arm is moved, the break contact opens before the make contact closes; and upon being released, the switch arm is biased to return to the position shown with the make opening before the break closes. In FIG. 38 is shown a make contact designated NORM. The NORM contact is closed whenever the NORM switch is operated to adjust the circuit for continuous operation. If the NORM switch is released (not operated), the NORM make contact will be open to permit the setting of the switches BCD1, BCD2, BCD4 and BCD8 in FIG. 38 to stop the circuit automatically after the processing of a number of time intervals according to the setting of the BCD switches.

Starting Conditions

The following test conditions are assumed:

1. switch F4 is operated to enable measurement of break intervals;
2. switch MAX is operated to enable measurement of maximum intervals;
3. switch MSEC<100 is operated since the intervals to be measured are less than 100 msec. in time duration;
4. the NORM switch id operated to allow continuous operation; and,
5. the break intervals to be measured, as shown in FIG. 1, are highs and the make intervals are lows from the DIAL PULSE INPUT box shown in FIG. 38.

With switch MSEC<100 closed, the decimal point lap DECPT in FIG. 40, which is physically located between the readout circuits NX2 of FIG. 40 and NX1 of FIG. 39, will be lighted in an obvious circuit under control of closed contacts F4-13 and MSEC<100-2. The decoder and readout circuits NX1, NX2 and NX3, as previously mentioned, convert or decode the binary 2421 code in the upper register to decimal values for lighting decimal lamps (numbers 0 to 9). NX3 indicates the tens digit, NX2 indicates the units digit, and NX1 indicates the tenths digit. If switch MSEC>100 were operated (measuring times greater than 100 msec.), contact MSEC<100-2 in FIG. 40 would be open and contact MSEC>100-2 in FIG. 40 would be closed, to thus extinguish the decimal point lamp DECPT such that the respective readout circuits NX3, NX2 and NX1 would visually show the respective hundreds, tens and units digits of the time registered in the upper register.

Clearing the System

The circuit is cleared or normalized by the momentary operation of the CLEAR switch in the upper left part of FIG. 38. This switch operation results in the following circuit functions:

1. the START/STOP flip-flop FF1 and the INPUT flip-flop FF2 in FIG. 38 are cleared (i.e., set to zero output states with their Q outputs low and their $\overline{Q}$ outputs high);
2. the lower register, consisting of counters CN6, CN7 and CN8 in FIGS. 39 and 40, is cleared (i.e., set to zero count);
3. the upper register, consisting of counters CN3, CN4 and CN5 in FIGS. 39 and 40 is set to capacity count;
4. the CARRY flip-flop FF3 in FIG. 40 is cleared (i.e., set to zero state—Q output low and $\overline{Q}$ output high);
5. the counter CN1 and the switches BCD1, BCD2, BCD4 and BCD8 in FIG. 38 are not involved in the circuit operation when the NORM switch in FIG. 38 is operated, as assumed; and,
6. the divide-by-ten counter CN2 in FIG. 38 is not involved since its 1 kHz. output is blocked by the open contact MSEC>100-1 in FIG. 39.

Prior to the operation of the CLEAR switch, the clear input CL of FF1 is low since the three inputs to OR gate G6 are low—one from the back contact of the CLEAR switch, one from the back contact of the STOP switch, and one from the output of AND gate G5, the left input of which is held low through contact F4-2 and NORM. Also, the clear input of FF2 is low since the two inputs to OR gate G7 are low—one from the CLEAR switch and one from the output of gate G5. When the CLEAR switch is operated, the lower input to gate G6 and the upper input to gate G7 go high, thus applying a high to the clear inputs CL of FF1 and FF2, thus to clear FF1 and FF2, the CP input of FF2 going low as soon as the output of single-shot SS8 goes low.

The high on the clear lead 381 in FIG. 38 extends into FIG. 39, through OR gate G9, contact F4-9, contact MAX-1 to conductor 391. The high on lead 391 extends through OR gate G10 to conductor 392 which connects to the clear inputs CL(A), CL(B), CL(C) and CL(D) of counters CN6 (FIG. 39) and CN7 (FIG. 40). The high on lead 391 in FIG. 39 extends into FIG. 40 and through OR gate G35 to the clear inputs CL(A), CL(B), CL(C) and CL(D) of counter CN8. The left input of gate G10 in FIG. 39 is held low to ground on lead 396, the right input of gate G10 in FIG. 39 is held low to ground over lead 397 to ground through contacts F4-7 and MAX-2, and the right input of gate G35 in FIG. 40 is held low to the ground on lead 397. Since the CP inputs of these counters are low under steady state conditions, the high on the clear inputs of counters CN6, CN7 and CN8 sets these counters (the lower register) to zero count.

With the lower register (counters CN6, CN7 and CN8 of FIGS. 39 and 40) set to zero count, all of the $\overline{Q}$ outputs—$\overline{Q}$(A) through $\overline{Q}$(D)—of these counters are high and the corresponding Q outputs are low. With the Q output of FF2 (FIG. 38) low, the output of gate G1 is low and the output of I1 is high on lead 382, which extends into FIG. 39, through closed contact F4-11, and to lead 393 of FIGS. 39 and 40. This high on lead 393 in FIGS. 39 and 40 causes the outputs of the transfer gates G11, G13, G15 and G17 of FIG. 39 and G19, G21, G23, G25, G27, G29, G31 and G33 of FIG. 40 to go high to apply a preset high signal to the PS inputs—PS(A) through PS(D)—of the upper register consisting of counters CN3, CN4 and CN5 of FIGS. 39 and 40. Since the CP inputs of these counters are held low under steady state conditions, the upper register is set to capacity count with all of its Q outputs—Q(A) through Q(D)—high and all of its $\overline{Q}$ outputs—$\overline{Q}$(A) through $\overline{Q}$(D)—low.

The high on lead 393 in FIG. 40 is also applied to the clear input CL of the carry flip-flop FF3, thus setting its Q output low, the CP input of FF3 being held low from single-shot SS7.

When the momentarily operated CLEAR switch in FIG. 38 is released, it returns to the condition shown with a low again applied to the lower input of gate G6, to the upper input of gate G7, and to the clear lead 381. This returns the clear inputs of CL of FF1 and FF2 in FIG. 38 to low and returns to low the clear inputs CL(—) of the lower register in FIGS. 39 and 40.

Priming the Input Flip-Flop

With the circuit cleared or normalized, as above, and the CLEAR switch in FIG. 38 returned to its normal condition as shown, the START switch in FIG. 38 is momentarily operated to prepare the input flip-flop FF2 of FIG. 38 to respond to the first break interval (high) of the input dial pulses. Prior to the operation of the START switch, the START/STOP flip-flop FF1 is set to zero (Q low and $\overline{Q}$ high) as a result of the prior clearing operation. The J and K inputs of FF2 were thus held respectively low and high through respective contacts F4-1 and F4-3 from the Q and $\overline{Q}$ outputs of FF1. Under these J and K input conditions FF2 cannot respond to a pulse on its input lead CP, which is connected through single-shot SS8 and contact F4-4 to the input dial pulses. The momentary operation of the START switch applies a high to the single-shot SS1, which produces a 1 msec. high at the input PS of FF1, which sets FF1 to the one state (Q high and $\overline{Q}$ low). This, in turn, sets the J and K inputs of FF2 to respective high and low conditions to enable FF2 to respond to a pulse on its CP input. The release of the START switch has no further effect.

First Break Interval

As previously explained, the dial pulse input in FIG. 38 is arranged to feed dial pulses through contact F4-4 and single-shot SS8 to the CP input of the FF2 and through contact F4-4 to the left input to gate G1, with the break intervals high and the make intervals low.

The first break applies a high pulse through single-shot SS8 to the CP input of FF2 to set FF2 to the one state (Q high and $\overline{Q}$ low). This enables gate G1 to repeat the high break at its output, in turn producing a low at the output of I1 on lead 382 into FIG. 39 and through contact F4-11 to lead 393 to disable the transfer gates G11 through G34 of FIGS. 39 and 40. In FIG. 38, the low on lead 382 extends through contact F4-5 to produce a high at the output of I3 on lead 385 to the upper input of gate G2. With the upper input of gate G2 high, the high clock pulses on the lead 10 kHz. in FIG. 38 are repeated on lead 383 at the output of gate G2. These high clock pulses (of say 50 msec. high and 50 msec. low) extend on lead 383 into FIG. 39, through contact MSEC<100-1, and through contact F4-6 and single-shot SS4 to the CP input of counter CN3. These high clock pulses are also applied to the input in FIG. 39 of regeneration circuit REG feeding the delayed single-shot DSS1 feeding the upper input of gate G3. Gate G3 is disabled at this time by a low on its lower input extending thereto from the low Q output of FF3 in FIG. 40, through contact MAX-4, and over lead 401 from FIG. 40 into FIG. 39. Thus, the high clock pulses are not repeated at the output of gate G3 which feeds the CP input of counter CN6 through contact F4-10.

The first high break thus allows the high clock pulses to be applied to the CP input of counter CN3 in FIG. 39. The first high clock pulse will cause the upper register (counters CN5, CN4, and CN3 of FIGS. 39 and 40) to go from capacity count (99.9) to zero count (00.0). The counter CN3 in FIG. 39 goes from 9 to 0 on the first clock pulse, thereby making its $\overline{Q}$ output go from low to high. The latter output on lead 394 extends through single-shot SS5 and over lead 398 into FIG. 40 to the CP input of counter CN4, thus causing it to go from 9 to 0. The low-to-high output at $\overline{Q}$ of CN4 is applied through single-shot SS6 to the CP input of CN5 causing it to go from 9 to 0. When the $\overline{Q}$ output of CN5 goes high, the carry flip-flop FF3 is toggled through single-shot SS7 so that its Q output goes from low to high.

When the carry flip-flop FF3 of FIG. 40 toggles to its one state (Q output high), the high on its Q output extends over closed contact MAX-4 to lead 401 and into FIG. 39 to the lower input of gate G3. Gate G3 is thus enabled to pass a regenerated and delayed clock pulse through delayed single-shot DSS1. The same clock pulse, at the CP input of counter CN3, which caused the upper register to go from capacity count (99.9) to zero count (00.0) causes the delayed single-shot DSS1 to produce a 1 μsec. high pulse at the upper input of gate G3 after a delay of 20 μsec. This delayed clock pulse is then accumulated in counter CN6 by setting it to a count of 1.

For the duration of the first high break interval, clock pulses (10 kHz. are serially added into both the upper and lower registers, and particularly into the lower register. If, for example, the first break should last for 53.4 msec., the following action takes place in the lower register:

1. the first 9 clock pulses drive counter CN6 to a count of 9;
2. the tenth clock pulse returns counter CN6 to zero, providing a low-to-high transition at its $\overline{Q}$ output;
3. the high at the $\overline{Q}$ output of counter CN6 causes single-shot SS2 to produce a 1 μsec. high into the upper input of gate G4;
4. since the lower input of gate G4 is held low through closed contact F4–12, the output of gate G4 goes high for 1 μsec. to apply a high pulse to lead 395 into FIG. 40 to the CP input of counter CN7 to insert a count of 1 into counter CN7;
5. the twentieth clock pulse at the CP input of counter CN6 of FIG. 39 causes that counter to again go from a count of 9 to zero count to advance the count to 2 in counter CN7 of FIG. 40;
6. when counter CN7 of FIG. 40 is driven from a count of 9 to a count of zero, its $\overline{Q}$ output goes from low to high to insert a count of one into counter CN8 through single-shot SS3;
7. the 530th clock pulse will have returned counter CN6 of FIG. 39 to zero, driven counter CN7 of FIG. 40 to a count of 3, and driven counter CN8 of FIG. 40 to a count of 5; and,
8. the 534th clock pulse at the input of CP of counter CN6 of FIG. 39 will have driven this counter to a count of 4.

As outlined above, assuming the first high break to last for 53.4 msec., the lower register will have counted 534 clock pulses of the 10 kHz. clock. CN8 is set at 5, CN7 is set at 3, and CN6 is set at 4. The upper register (counters CN3, CN4 and CN5 of FIGS. 39 and 40) will have arrived at a count of 533 (CN5, CN4, CN3) since the first clock pulse was used to return the upper register to zero from a 999 condition.

First Make Interval

At the end of the first high break (the beginning of the first low make interval), the following circuit action takes place:

1. the left input of gate G1 in FIG. 38 goes low to provide a low input to I1, which provides a high on lead 382;
2. the high on lead 382 extends through contact F4–5 to produce a low output from I3 on lead 385 to disable gate G2, thus stopping any further 10 kHz. clock pulses from being applied over lead 383 into the registers of FIGS. 39 and 40;
3. the high on lead 382 in FIG. 38 extends into FIG. 39, through contact F4–11, and over lead 393 to the left inputs of the transfer gates G11 through G34 of FIGS. 39 and 40 to transfer to the upper register (CN3, CN4, and CN5) the nine's complement (one's complement of the 2421 binary code) of the count then in the lower register (CN6, CN7, and CN8); and,
4. the high on lead 393 in FIG. 40 is applied to the clear lead CL of the carry flip-flop FF3 to set it to its zero state (Q output low), thereby applying a low through contact MAX-4 and over lead 401 into FIG. 39 to disable gate G3 at the CP input of the lower register counter CN6 (this clear signal at the CL input of FF3 in FIG. 40 overrides any change which might occur on the CP input of FF3).

With regard to the transfer, it will be noted in FIGS. 39 and 40 that the $\overline{Q}(-)$ output leads from the counters CN6, C7 and CN8 control the PS(−) inputs of the counters CN3, CN4 and CN5 and that the Q(−) outputs of the lower register control the CL(−) inputs of the upper register. This means that while the transfer gates are enabled by the high on lead 393, with the CP inputs of the upper counters low, the upper counters will be set at the complement of whatever is in the lower counters, which is why the self-complementing 2421 code is used here. For instance, in the assumed case where the lower counters contain the count of 53.4 msec. (CN8, CN7, CN6), the nine's or one's complement of 46.5 msec. (CN5, CN4, CN3) will be transferred to the upper counters. Looking at counters CN6 and CN3 of FIG. 39, with a 4 registered in CN6, its outputs $\overline{Q}$(A), $\overline{Q}$(B), Q(C) and $\overline{Q}$(D) will be high and its outputs Q(A), Q(B), $\overline{Q}$(C) and Q(D) will be low. The highs on outputs $\overline{Q}$(A), $\overline{Q}$(B), Q(C) and $\overline{Q}$(D) will pass through gates G11, G13, G16 and G17 to apply highs to inputs PS(A), P(B), CL(C), and PS(D) to set stages A, B, C, and D of counter CN3 to respective states of 1101 to represent a 5 in the 2421 binary code. Thus, counter CN3 of the upper register is set to the nine's complement (5) of the 4 currently in counter CN6 of the lower register. Similarly, the 3 in counter CN7 of FIG. 40 is transferred to counter CN4 as a 6 (A, 0 -B,0 -C,1 -D,1) and the 5 in counter CN8 is transferred to counter CN5 as a 4 (A,0 -B,0 -C,1 -D,0).

At this point, the decoder and readout circuits NX1, NX2, and NX3 of FIGS. 39 and 40 will decode the 2421 binary coding of the upper register into a decimal indication of the nine's complement to light three numeral lamps —a 5 for NX3, a 3 for NX2 and a 4 for NX1. With the decimal point lamp DECPT lit (and physically located between NX1 of FIG. 39 and NX2 of FIG. 40), the readout circuits, when physically reversed (left to right) will provide a visual readout of 53.4 msec.

Second Break Interval at the start of the second high break interval (end of the first low make), gate G1 in FIG. 38 again provides a high output to produce a low on lead 382 at the output of I1. The low on lead 382 extends through contact F4–5 to provide a high at the output of I3, which again enables gate G2 to pass high clock pulses to lead 383 into FIG. 39. The low on lead 382 also extends into FIG. 39, through contact F4–11, and to lead 393 in FIGS. 39 and 40 to disable the transfer gates G11 through G34 of FIGS. 39 and 40.

With gate G3 in FIG. 39 disabled by the low on its lower input (over lead 401 from the reset carry flip-flop FF3 of FIG. 40), no delayed clock pulses can be applied to the CP input of counter CN6. Thus, the lower register (CN6, CN7 and CN8 of FIGS. 39 and 40) contains the first break time count of 53.4 msec. and will not change its count until or unless gate G3 in FIG. 39 is enabled by a toggle of the carry flip-flop FF3 in FIG. 40.

The upper register (CN3, CN4 and CN5 of FIGS. 39 and 40), which contains the nine's complement (46.5) of the count (53.4) in the lower register, will be driven by the clock pulses during the time of the second high break interval.

If the second break lasts just as long as the first one, then 534 clock pulses will be serially added into the upper register to cause it to go to a count of 999. If the second break is shorter than the first one, then the upper register will be driven to some count less than 999. If the second break is longer than the first break, the upper register will be driven to a count of 999, then to 000, and then to some value higher than zero.

Second Break not Longer than First Break

Assuming that the second break interval is shorter (less than 53.4 msec.) than the first break, or exactly the same (53.4 msec.) as the first break, the upper register will be driven to a count of 999 or less. Thus, the carry flip-flop FF3 in FIG. 40 is not toggled and its Q output stays low to keep gate G3 in FIG. 39 disabled, so that no clock pulses are added to the count in the lower register.

At the end of the second break interval, as discussed above with respect to the end of the first break, gate G2 of FIG. 38 is disabled to stop further clock pulses from being applied to lead 383 into FIG. 39, the carry flip-flop FF3 in FIG. 40 has a steady high applied to its CL input to force FF3 (CP input low) to remain in its zero state (Q output low), and the transfer gates G11 through G34 of FIGS. 39 and 40 are enabled to transfer to the upper register the complement of the count then in the lower register. Since the count (53.4 msec.) in the lower register is equal to or greater than the time of the second break, that as of the two times is the maximum so far.

Second Break Longer than First Break

If the second break interval is longer than the first break interval, the clock pulse count serially added to the upper register (existing count is the nine's complement of lower register) will cause the upper register to exceed its capacity. This will cause the excess clock pulses to be serially added to the lower register (the first break interval pulse count) so that the lower register will contain the new and longer break interval pulse count.

Clock pulses will be serially added to the count of 465 (46.5) in the respective counters CN5, CN4 and CN3 of the upper register in FIGS. 39 and 40. Since the count of 534 (53.4)in the respective counters CN8, CN7 and CN6 of the lower register in FIGS. 39 and 40 represents the duration of the first break, and since it is assumed that the second break will be longer, the first 534 clock pulses will cause the upper register to arrive at a count of 999.

For example, let it be assumed that the second break lasts long enough (58.9 msec.) to cause 589 clock pulses to be added into the upper register. This will cause the upper register (counters CN5, CN4 and CN3) to go to a count of 999 in response to the first 534 clock pulses, to a count of 000 on the 535th clock pulse, and to a count of 054 on the 589th clock pulse. When the upper register goes from 999 to 000, the carry flip-flop FF3 in FIG. 40 is set (its Q output goes from low to high). The high at the Q output of FF3 extends, as above described, through contact MAX-4 and over lead 401 into FIG. 39 to the lower input of gate G3 to enable gate G3 to pass delayed clock pulses to the counter CN6. Fifty-five (55) clock pulses will thus be serially added into the lower register (previously containing a count of 534 to bring the count up to 589 (58.9 msec.).

At the end of the second break, the lower register will have been advanced in count to the longer second break of 58.9 msec. and the upper register will have advanced to a count of 05.4. At this time, as previously discussed, the clock gate G2 of FIG. 38 is disabled, the carry flip-flop FF3 of FIG. 40 is cleared (its Q output goes from high to low), and the nine's complement (410) of the count (589) in the lower register is transferred to the upper register. The lower and upper registers thus contain pulse counts indicative of the maximum break so far.

Additional Break Intervals

The above process will continue until the circuit action is stopped either (1) by the dial pulse input at the left input of gate G1 in FIG. 38 remaining low (continuous make) or (2) by operation of the STOP switch in FIG. 38.

If the break pulsing stops being supplied by the dial pulse input in FIG. 38, gate G2 in FIG. 38 will remain disabled and the lower and upper registers will contain their last pulse counts, namely the respective maximum break count and its nine's complement.

If it is desired to manually stop the circuit action at any time, the STOP switch in FIG. 38 may be momentarily operated. A momentary operation of the STOP switch will apply a high to the upper input of gate G6, which will apply a high to the clear input CL of the START/STOP flip-flop FF1 to clear it so its Q output goes low and its $\overline{Q}$ output goes high. This reverses the conditions at the J and K inputs of the input flip-flop FF2 (J goes from high to low and K goes from low to high) so that, upon the next ensuing make-to-break (low to high) transition of the input dial pulses, the input flip-flop FF2 will be cleared or reset (Q output goes from high to low and $\overline{Q}$ output goes from low to high). This transition of the input dial pulses from low to high extends in FIG. 38 through contact F4–4 and single-shot SS8 to the input CP of FF2 to toggle FF2 to the clear or reset condition. When the latter occurs, the Q output of FF2 will apply a low to the right-hand input of gate G1 to disable gate G1 from passing any further dial pulse transitions to inverter I1, etc.

Automatic Circuit Stopping

The four ganged BCD switches in the left part of FIG. 38, along with the 8421 BCD counter CN1 in FIG. 38, are used to stop the circuit action after the processing of a prescribed number of measured intervals. If, for instance, it is desired to measure the maximum break over five pulse periods, the BCD switches will be set to 5 with the NORM switch unoperated: this will cause the circuit operation to stop at the leading edge (low-to-high) of the sixth break.

When the circuit is cleared or normalized, as previously discussed, the high from the $\overline{Q}$ output of the input flip-flop FF2 extends to the R9(1) input of counter CN1 to set that counter to nine (i.e., outputs B and C are low and outputs A and D are high). The four diodes DA, DB, DC and DD act such that if any of the outputs A, B, C and D of counter CN1 is low, the left hand terminal of the corresponding diode will be held low and any switch wiper (BCD1, BCD2, BCD3 or BCD4) connected thereto will be held low. Since all of the switch wipers are connected in parallel to resistance R1 and to lead 384, which extends through contact F4–2 to the left input of gate G5, the output of gate G5 will be held low, if any connected diode is low. Conversely, the output of gate G5 can go high only if the four switch wipers are in a position where all of the connected diodes DA, DB, DC, and DD are connected to high outputs A, B, C and D of counter CN1. In the assumed case, where the switches are set on 5, the lead 384 can go high only when the outputs A and C (1 and 4) of counter CN1 are both high, which occurs only when counter CN1 is advanced to a count of 5, which occurs on the leading edge of the sixth break. Counter CN1 advances from its starting condition of 9 to 0, 1, 2, 3, 4, 5, etc.

Whenever counter CN1 reaches the prescribed count (the leading edge of the sixth break interval), the left input of gate G5 will go high to allow a high pulse from the delayed single-shot DSS2 in FIG. 38, as will be explained, to clear the START/STOP and input flip-flops FF1 and FF2 to stop the circuit action.

When the circuit is in operation, it will be recalled that flip-flops FF1 and FF2 are in the set condition (Q outputs high and $\overline{Q}$ outputs low). Each low-to-high transition at the leading edge of each high break interval will, as previously discussed, produce a high at the output of gate G1. The pulse at the output of gate G1 causes the delayed single-shot DSS2 to produce at the right input of gate G5 a short high pulse (about 1 msec.) delayed about 1 msec. This pulse will have no effect unless the left input of gate G5 is high at that time. The low-to-high pulse at the output of gate G1 also causes inverter I2 to produce a high-to-low transition at the input CP of counter CN1. The $\overline{Q}$ output of the input flip-flop FF2 is applying a low to input R9(1) of counter CN1 to enable it to respond to low pulses on its input CP. The counter CN1 thus advances one count at the leading edge of each high break interval.

The first break (high leading edge) will advance the counter CN1 from its initial setting of nine (B and C outputs low and A and D outputs high) to a count of zero (all outputs A, B, C and D low). The leading edge of the second break causes counter CN1 to advance to a count of one (A output high and outputs B, C and D low). The third break causes counter CN1 to advance to a count of two (output B high, outputs A, C and D low). The fourth break causes counter CN1 to advance to a count of three (outputs A and B high, outputs C and D low). The fifth break causes counter CN1 to advance to a count of four (output C high, outputs A, B and D low). The leading edge of the sixth break causes counter CN1 to advance to a count of five (outputs A and C high, outputs B and D low). With outputs A and C of counter CN1 both high, lead 384 will go high to enable gate G5. The delayed high pulse from delayed single-shot DSS2 will produce a high pulse on the output of gate G5 to clear both flip-flops FF1 and FF2 (Q outputs low and $\overline{Q}$ outputs high) to stop the circuit operation, the CP input of FF2 having returned to low under control of single shot SS8.

Due to the 1 msec. delay in delayed single-shot DSS2 in FIG. 38 and its 1 msec. pulse output, it is possible, but not likely, for part of a clock pulse to reach the input CP of counter CN3 in FIG. 39. This could add one clock pulse to the count in the upper register: this is of no consequence, however, since with switch MSEC<100 operated, the possible readout error is only one-tenth of a millisecond (out of perhaps 50 msec.) and with switch MSEC<100 operated, the possible readout error is only 1 msec. (out of perhaps hundreds). Since gate G3 in FIG. 39 is disabled at the time of the leading edge (low-to-high) of the sixth break, no extra clock pulse will reach counter CN6 in FIG. 39: thus, the lower register will contain the previous accurate maximum count, which will be transferred to the upper register as soon as FF2 in FIG. 38 is cleared by the automatic stop action.

Although not disclosed, in actual practice the input interface (such as the dial pulse input box in FIG. 38) would probably be arranged such that the input pulse transitions are synchronized with the clock pulse source, as suggested hereinbefore. This would insure that any significant transition of the input occurs when the clock output was low, thus preventing the otherwise most unlikely appearance of any part of one extra clock pulse at the input CP of counter CN3 in FIG. 39 when the circuit action is stopped. However, as mentioned above, nonsynchronous action injects no error of any consequence, if any at all.

Measuring Interval Greater Than 100 Msecs.

The previous description assumed that the switch MSEC<100 was operated (and switch MSEC>100 released) to allow measurement and readout of break intervals less than 100 msec. in duration. This assumed the closing of contact MSEC<100–1 and the opening of contact MSEC>100–1 in FIG. 39 and the closing of contact MSEC<100–2 and the opening of contact MSEC>100–2 in FIG. 40. That situation allowed 10 kHz. clock pulses from FIG. 38 to be passed through gate G2 into FIG. 39 and to the upper and lower registers This allowed counters CN5 and CN8 (FIG. 40) to count tens of milliseconds, counters CN4 and CN7 (FIG. 40) to count units of milliseconds, and counters CN3 and CN6 (FIG. 39) to count tenths of milliseconds.

If switch MSEC>100 is operated and switch MSEC<100 is released, in FIG. 39 contact MSEC>100–1 would be closed and contact MSEC<100–1 would be open. This prevents the 10 kHz. clock pulses from being used for counting purposes and allows the 2421 BCD counter CN2 in FIG. 38 to be used to produce 1 kHz. clock pulses on its $\overline{Q}$ output, which extend over the 1 kHz. clock pulse lead into FIG. 39 and through closed contact MSEC>100–1 to the counters of FIGS. 39 and 40. Under these circumstances, counters CN5 and CN8 (FIG. 40) will represent hundreds of milliseconds, counters CN4 and CN7 (FIG. 40) will represent tens of milliseconds and counters CN3 and CN6 (FIG. 39) will represent units of milliseconds.

When the circuit is cleared or normalized, as previously discussed, the $\overline{Q}$ output of flip-flop FF2 in FIG. 38 is made high, which produces a high at the output of gate G8 in FIG. 38. The high output of gate G8 will set the counter CN2 to a count of 5 upon the occurrence of the first low clock pulse (at the CP input of counter CN2) from the 10 kHz. source. This means that stages A, B and D are set to state one (preset) and stage C is set to state zero (cleared). Under these circumstances the $\overline{Q}$ output of counter CN2, which is the same as the $\overline{Q}$(D) output, is low. As long as the output of gate G8 is high, any high clock pulses at input CP of counter CN2 do not change the preset count of 5.

When the circuit is started, flip-flop FF2 is set (Q output high and $\overline{Q}$ output low) to cause gate G1 to have a high output during breaks (highs) and a low output during makes (lows) and to cause gate G8 to have a low output during breaks (highs) and a high output during makes (lows). Thus, the output of gate G8 will allow the 10 kHz. clock pulses (highs) to advance the count in counter CN2 during breaks, to again preset counter CN2 to 5 during makes, and to prevent the 10 kHz. clock from advancing count CN2 during makes.

As counter CN2 advances its count during the break interval being measured, it advances one count for each one-tenth of a millisecond under control of the 10 kHz. clock. The count will advance from 5 to 6 to 7 to 8 to 9 to 0 to 1 to 2, to 3 to 4 to 5, etc. Only when the count advances from 9 to 0 does the $\overline{Q}$ output of counter CN2 go from low to high, at other times, the $\overline{Q}$ output either stays high, stays low, or goes from high to low. Each time the $\overline{Q}$ output goes from low to high (once for each 10 clock pulses of 10 kHz. the 1 kHz. lead carries a high clock pulse at the rate of 1 kHz.

The fact that counter CN2 must count five 10 kHz. clock pulses before producing the first 1 kHz. clock pulse injects an error in the timing of the break interval of one-half millisecond, which is of no great consequence when measuring intervals greater than 100 msec. in duration.

As soon as the end of the break (high) occurs, the right input of gate G8 will go high to preset counter CN2 to a count of 5 and to stop the 10 kHz. clock from controlling counter CN2 for the duration of the make.

It is to be understood that the above-described arrangement is illustrative of the application of the principles of the invention. Numerous other arrangements may be devised by those skilled in the art without departing from the spirit and scope of the invention.

What we claim is:

1. Circuitry for measuring the maximum time interval between pairs of signals among a plurality of such pairs comprising:

A. a first register;

B. a second register;

C. means controlled by a first pair of signals for causing the first register to contain a registration indicative of the time interval between the signals of the first pair;

D. means controlled by the later occurring signal of each pair for causing the second register to contain a registration indicative of the registration then in the first register;

E. means controlled by each pair of signals succeeding the first pair for causing the second register to change its old registration to a new registration indicative of the difference between the new time interval between the signals of such succeeding pair and the old time interval indicated by the old registration;

F. and, means controlled by the second register during the time interval between the signals of such succeeding pair for causing the first register to contain a registration indicative of the longer of the new and old time intervals.

2. Circuitry for measuring the maximum time interval between pairs of signals among a plurality of such pairs comprising:

A. a source of pulses recurring at a constant frequency substantially greater than the recurrence frequency of the two signals of each pair;

B a first pulse count register;

C a second pulse count register.

D means controlled by a first pair of signals for causing the first register to contain a pulse count indicative of the number of pulses from the source occurring during the time interval between the signals of the first pair;

E means controlled by the later occurring signal of each pair for causing the second register to contain a pulse count indicative of the pulse count then in the first register;

F means controlled by each pair of signals succeeding the first pair for causing the second register to change its old pulse count to a new pulse count indicative of the difference between the new time interval between the signals of such succeeding pair and the old time interval indicated by the old pulse count;

G. and, means controlled by the second register during the time interval between the signals of such succeeding pair for causing the first register to contain a pulse count indicative of the number of pulses from the source occurring during the longer of the new and old time intervals.

3. Circuitry for measuring the maximum time interval between pairs of signals among a plurality of such pairs comprising:

A. a source of pulses recurring at a constant frequency substantially greater than the recurrent frequency of the two signals of each pair;

B. a first pulse count register of a given count capacity;

C. a second pulse count register of the same given count capacity;

D. means for causing pulses from the source to be counted in the first register during the first time interval between the signals of a first pair;

E. means controlled by the later occurring signal of each pair for causing the second register to contain a pulse count equal to the complement of the pulse count then in the first register;

F. means controlled by each pair of signals succeeding the first pair for adding source pulses to the pulse count in the second register during the time interval between the signals of such succeeding pair;

G. and, means controlled by the second register during the time interval between the signals of such succeeding pair for causing the pulse count in the first register to equal the sum of the pulse count in the first register at the start of the interval and the number of source pulses exceeding the capacity of the second register.

4. Circuitry for measuring the maximum time interval between pairs of signals among a plurality of such pairs comprising:

A. a source of pulses recurring at a constant frequency substantially greater than the recurrence frequency of the two signals of each pair;

B. a first pulse count register of a given count capacity;

C. a second pulse count register of the same given count capacity;

D. means for causing pulses from the source to be counted in the first register during the first time interval between the signals of a first pair;

E. means controlled by the latter occuring signal of each pair for causing the second register to contain a pulse count equal to the complement of the pulse count then in the first register;

F. means controlled by each pair of signals succeeding the first pair for adding source pulses to the pulse count in the second register during the time interval between the signals of such succeeding pair;

G. and, means controlled by the second register during the time interval between the signals of such succeeding pair for adding to the pulse count in the first register all source pulses exceeding the capacity of the second register.

5. The invention defined in claim 4 wherein:

A. the second register comprises an up-counter responsive to each pulse transmitted thereto to increase by one the pulse count therein:

B. and, the means for adding source pulses to the pulse count in the second register comprises first gating means controlled by a pair of signals for allowing source pulses to be transmitted to the up-counter during the time interval between the signals of the pair.

6. The invention defined in claim 5 wherein:

A. the first register comprises a first up-counter responsive to each pulse transmitted thereto to increase by one the pulse count therein;

B. the second register-up-counter comprises a second up-counter;

C. and, the means for adding source pulses to the pulse count in the first register comprises second gating means controlled by the second up-counter during the time interval between the signals of a pair for allowing all source pulses exceeding the capacity of the second up-counter during the time interval to be transmitted to the first up-counter.

7. The invention defined in claim 6 wherein:

A. the second up-counter includes means for providing a control signal upon the addition to the second up-counter of a source pulse exceeding the capacity thereof;

B. and, the second gating means is controlled by the control signal to allow source pulses to be transmitted to the first up-counter.

8. The invention defined in claim 7 wherein:

A. the second up-counter comprises a plurality of binary counting stages settable from capacity count to zero count upon the addition of a source pulse;

B. and, the means for providing a control signal comprises a control signal generator controlled by the second up-counter to generate the control signal whenever the second up-counter is set from capacity count to zero count.

9. The invention defined in claim 8 wherein:

A. the first up-counter comprises a plurality of binary counting stages equal in number to the plurality of stages in the second up-counter;

B. and, the means for causing the second register to contain a pulse count equal to the complement of the pulse count in the first register comprises a plurality of transfer gates connected between the first and second up-counters and controlled by the later occurring signal of a pair to transfer to the second up-counter as a new count therein the complement of the count then existing in the first up-counter.

10. The invention defined in claim 9 wherein the first gating means comprises a first gate connected between the source of pulses and the second up-counter.

11. The invention defined in claim 10 wherein the second gating means comprises a second gate connected between the first gate and the first up-counter.

12. The invention defined in claim 9 wherein the means for causing source pulses to be counted in the first register during the first time interval between the signals of a first pair comprises means effective prior to measurement of time intervals for registering zero count in the first up-counter by setting all stages thereof to binary zero.

13. The invention defined in claim 12 wherein the means for causing source pulses to be counted in the first register during the first time interval between the signals of a first pair also comprises means effective prior to measurement of time intervals for registering maximum count in the second up-counter by setting all stages thereof to binary one.